United States Patent [19]  
Off et al.

[11] 3,880,697  
[45] Apr. 29, 1975

[54] METHOD OF AND APPARATUS FOR MAKING BONDED BELT LOOPS
[75] Inventors: Joseph W. A. Off; Darrel J. Wilbanks, both of Irving, Tex.
[73] Assignee: Hagger Company, Dallas, Tex.
[22] Filed: Sept. 7, 1973
[21] Appl. No.: 395,227

[52] U.S. Cl. ............... 156/467; 83/676; 156/202; 156/259; 156/271; 156/517
[51] Int. Cl............................................... B31f 1/00
[58] Field of Search............ 156/212, 216, 200–203, 156/250, 256, 259, 271, 324, 443, 461, 463, 156/467, 510, 516, 517, 555, 499, 466; 83/676

[56] References Cited
UNITED STATES PATENTS

| | | | |
|---|---|---|---|
| 2,702,067 | 2/1955 | Goldberg | 156/467 |
| 3,307,995 | 3/1967 | Martin | 156/216 |
| 3,388,017 | 6/1968 | Grimslet et al. | 156/466 X |
| 3,489,630 | 1/1970 | Katz et al. | 156/467 X |
| 3,615,973 | 10/1971 | Meeder | 156/324 X |
| 3,757,618 | 9/1973 | Kuts | 83/676 X |
| 3,758,364 | 9/1973 | Edelman | 156/202 X |

FOREIGN PATENTS OR APPLICATIONS
928,384 6/1963 United Kingdom................. 156/259

*Primary Examiner*—Charles E. Van Horn
*Assistant Examiner*—David A. Simmons
*Attorney, Agent, or Firm*—Richards, Harris & Medlock

[57] ABSTRACT

In a system for making bonded belt loops, a layer of thermally activated adhesive material is provided on one side of a strip of interfacing material. The reverse side of a strip of belt loop material is engaged with the side of the strip of interfacing material opposite the adhesive layer. An endless belt is utilized to transport the strip of belt loop material and the strip of interfacing material along support structure and into engagement with a revolving bonding drum. Rotating knives are disposed on opposite sides of the support structure for trimming the strip of belt loop material to a predetermined width. Thereafter a folding apparatus is utilized to fold the opposite edges of the strip of belt loop material around the strip of interfacing material. The bonding drum includes heating apparatus and functions to activate the adhesive layer on the strip of interfacing material. Simultaneously the endless belt engages the folded edges of the strip of belt loop material with the activated adhesive layer, thereby permanently bonding the strip of belt loop material to the strip of interfacing material.

12 Claims, 5 Drawing Figures

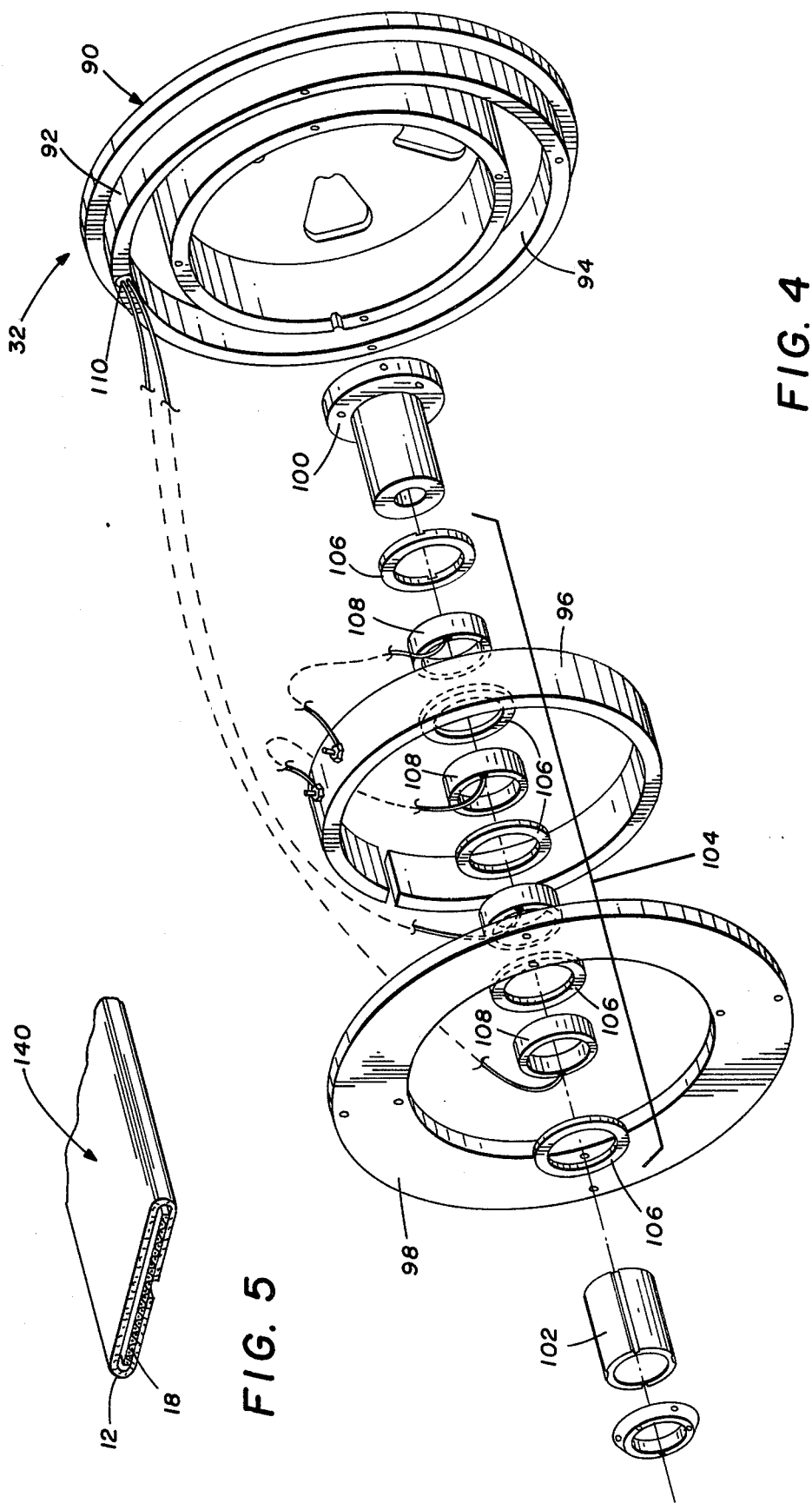

METHOD OF AND APPARATUS FOR MAKING BONDED BELT LOOPS

BACKGROUND AND SUMMARY OF THE INVENTION

This invention relates to a method of and apparatus for making bonded belt loops, and more particularly to a system for making bonded belt loops on a continuous basis.

In the manufacture of men's trousers and similar garments, belt loops have traditionally been fabricated by means of sewing. However, notwithstanding the long-term and widespread use of the sewing procedure for making belt loops, a number of problems relating to the manufacture of trousers and similar garments are known to originate with the use of the sewing procedure in making belt loops. For example, the sewing procedure is not readily adapted to automation. This means that in the manufacture of the total garment, the belt loop manufacturing phase introduces a number of time-consuming manual operations and therefore tends to add considerable cost to the manufacture of the garment. Moreover, although sewn belt loops are satisfactory in the traditional narrow widths, there is presently a trend towards the use of wide belt loops in the manufacture of men's trousers. It has been found that sewn belt loops having such widths tend to distort and wrinkle, and are otherwise generally unsatisfactory.

The present invention comprises a belt loop manufacturing system which overcomes the foregoing and other problems long since associated with the prior art. In accordance with the broader aspects of the invention, belt loops are fabricated by bonding a strip of belt loop material to a strip of interfacing material. The bonding procedure is carried out on a continuous basis, thereby eliminating the numerous manual operations which are required when belt loops are made by means of sewing. Moreover, belt loops of any desired width can be manufactured by means of the invention, and do not exhibit any tendency toward wrinkling or distortion even when fabricated to widths of 1 ¼ inches or greater.

In accordance with more specific aspects of the invention, a layer comprising a thermally activated adhesive material is provided on one side of a strip of interfacing material. The strip of interfacing material and a strip of belt loop material are transported along a predetermined path with the reverse side of the belt loop material engaging the side of the interfacing material opposite the adhesive layer. The strip of belt loop material is initially trimmed to a predetermined width and is then folded around the strip of interfacing material. The adhesive layer is then heated sufficiently to effect activation thereof. Simultaneously the folded edges of the strip of belt loop material are engaged with the activated adhesive layer, thereby permanently bonding the strip of belt loop material to the strip of interfacing material.

In accordance with still more specific aspects of the invention, the strip of interfacing material and the strip of belt loop material are transported along support structure and into engagement with a revolving bonding drum by an endless belt. The belt loop material is trimmed by means of a pair of opposed rotating knives located adjacent the path of the material and at the opposite end of the support structure from the bonding drum. The knives each have a non-circular cross section and thereby assist the endless belt in transporting the strip of belt loop material along the initial portion of the path.

The folding apparatus is situated at a point in the support between the rotating knives and the rotating drum. The folding apparatus includes structure comprising an extension of the support structure which supports the strip of interfacing material, the mid-portion of the strip of belt loop material, and the endless belt. Groove structure is disposed between the support structure to receive the opposite edges of the strip of belt loop material and thereby serves to fold the edges of the strip of belt loop material under the strip of interfacing material.

The revolving bonding drum comprises an aluminum ring having a relatively large diameter peripheral surface and a heating ring disposed beneath the surface of the drum. Upon leaving the folding apparatus, the strip of belt loop material and the strip of interfacing material are pressed into engagement with the surface of the drum by the endless belt and are transported by the drum through substantially the complete revolution thereof. By this means the adhesive layer of the strip of interfacing material is activated and the folded edges of the strip of belt loop material are simultaneously engaged with the activated adhesive material, thereby permanently bonding the strip of belt loop material to the strip of interfacing material.

DESCRIPTION OF THE DRAWINGS

A more complete understanding of the invention may be had by referring to the following Detailed Description when taken in conjunction with the accompanying drawings, wherein:

FIG. 4 is an exploded view illustrating the revolving bonding drum apparatus of the system; and FIG. 5 is a sectional view illustrating a bonded belt loop made in accordance with the invention.

DETAILED DESCRIPTION

Figures 1, 3:
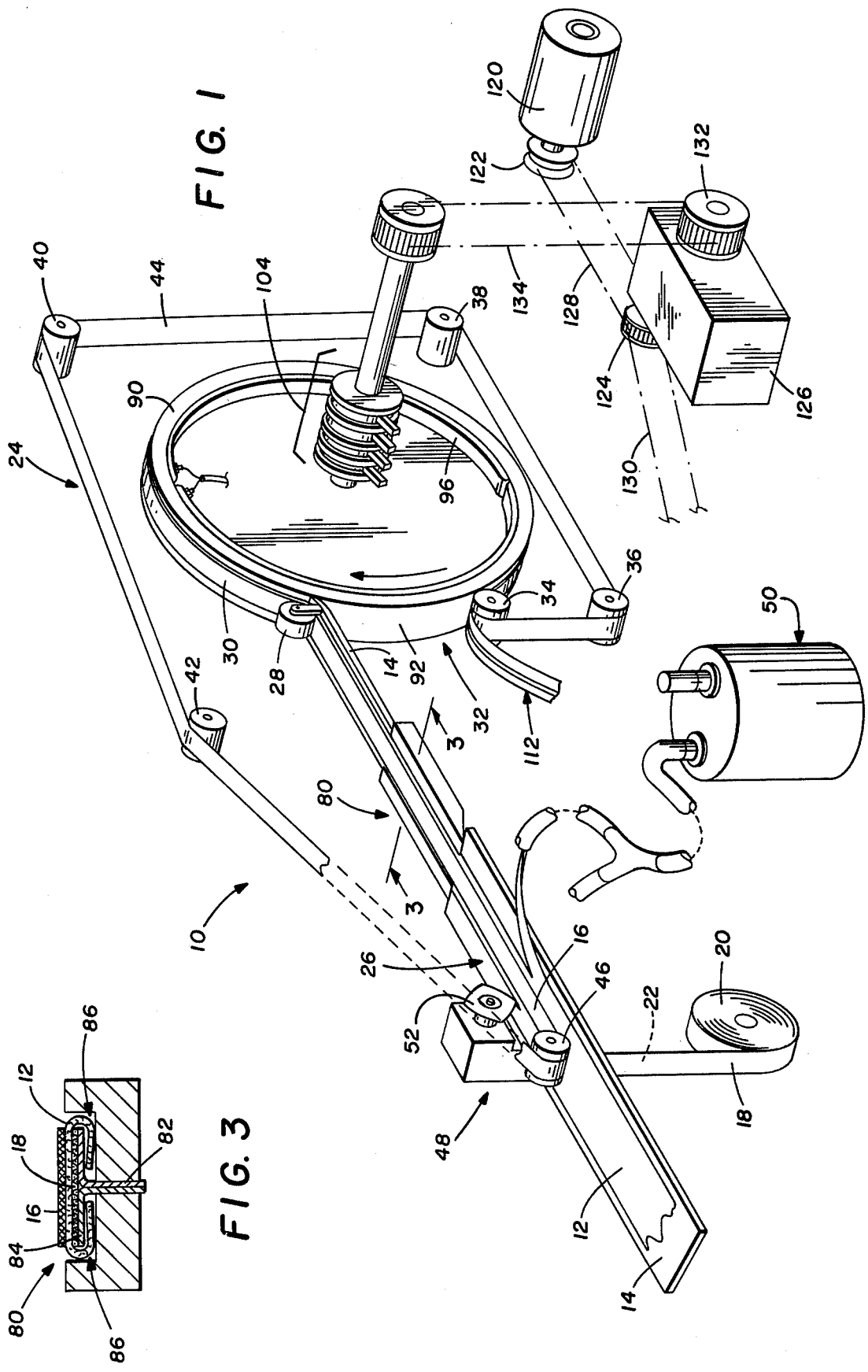
FIG. 1 is a somewhat diagrammatic illustration of a system for making bonded belt loops incorporating the invention.
FIG. 3 is a sectional view taken generally along the line 3—3 in FIG. 1 and illustrating the folding apparatus of the system.

Referring now to the Drawings, and particularly to FIG. 1 thereof, there is shown a system for making bonded belt loops 10 incorporating the invention. In the use of the invention, strips of belt loop material 12 are sequentially fed into the system 10 by an operator who positions the strips 12 lengthwise on a support 14. Each strip 12 is then manually advanced into engagement with an endless belt 16 which functions to transport the strip throughout the remainder of the system 10.

A strip of interfacing material 18 is also received between the support 14 and the endless belt 16. The strip of interfacing material 18 passes upwardly from a supply reel 20 through a slot from the support 14 and under the strip of belt loop material 12. The strip of interfacing material 18 may comprise a stiffened open weave horsehair or cotton material of the type known as crinoline. Preferably, however, the strip of interfacing material 18 comprises a polyester base non-woven interfacing material of the type supplied by Wendell Textiles of Baltimore, Md. Other types of man-made non-woven interfacing materials may also be used.

The strip of interfacing material 18 differs from conventional interfacing materials in that one side of the strip 18 is coated with an adhesive layer 22. Preferably, the adhesive layer 22 of the strip of interfacing material 18 comprises a thermally activated adhesive material. For example, polyamide, the adhesive material supplied by Wendell Textiles of Baltimore, Md., may be utilized in the practice of the invention.

Each strip of belt loop material 12 is preferably fed into the system 10 with the obverse side thereof facing upwardly. The strip of interfacing material 18 is fed into the system 10 with the adhesive layer 22 in engagement with the support 14. It will thus be understood that as the strip of belt loop material 12 and the strip of interfacing material 18 enter the system 10, the reverse side of the strip of belt loop material 12 engages the side of the strip of interfacing material 18 opposite the adhesive layer.

The endless belt 16 is constrained for movement around a course 24 including a portion 26 extending along the support 14.

The belt 16 then passes under an idler roller 28 and into a portion 30 of the course 24 which extends around a substantial portion of the periphery of a revolving bonding drum apparatus 32. The belt 16 then passes around a series of idler rollers 34, 36, 38, 40 and 42 which define a return portion 44 of the course 24. The belt 16 then passes around an idler roller 46 and into the portion 26 of the course 24.

The belt 16 initially transports the strip of belt loop material 12 and the strip of interfacing material 18 into a trimming apparatus 48 which functions to trim the strip of belt loop material 12 to a predetermined width. Belt loop material removed by the trimming apparatus 48 from the opposite sides of the strip 12 is received by a vacuum system 50. The trimming apparatus 48 comprises opposed continuously rotating cutting wheels 52 disposed on the opposite sides of the support 14 and at the opposite end thereof from the revolving bonding drum apparatus 32. As is best shown in FIG. 1, the cutting wheels 52 have non-circular peripheries, and therefore function to assist the belt 16 in advancing the strip of belt loop material 12 into the system 10.

Figure 2:
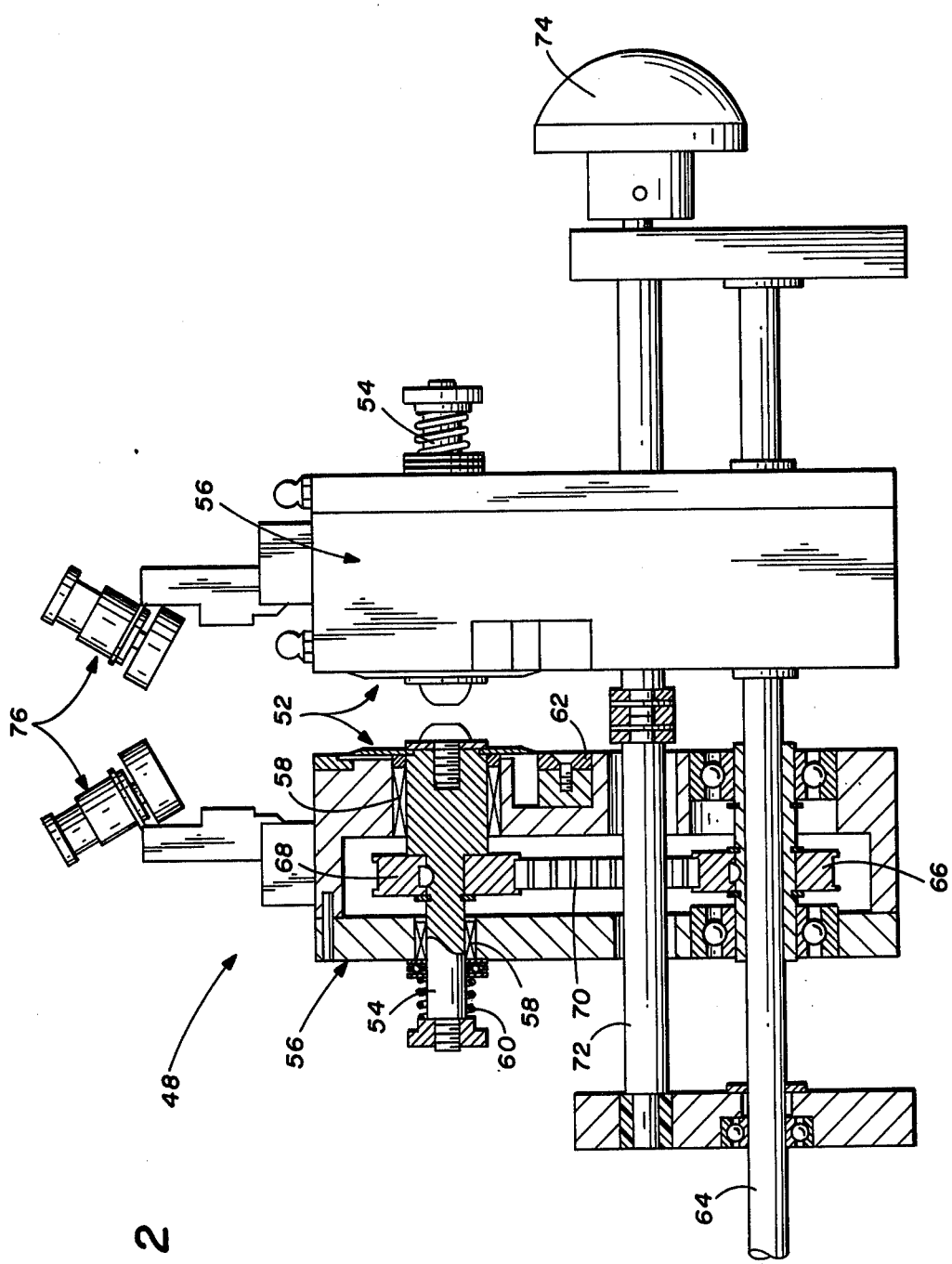
FIG. 2 is an illustration of the trimming apparatus of the system shown in FIG. 1 in which certain parts have been broken away more clearly to illustrate certain features of the invention.

The structural details of the trimming apparatus 48 are further illustrated in FIG. 2. The cutting wheels 52 are supported on countershafts 54 which are rotatably supported in opposed housing sections 56 by means of bearings 58. Springs 60 are provided for biasing the cutting wheels 52 into engagement with carbide inserts 62. By this means the cutting wheels 52 cooperate with the inserts 62 to effect cutting.

Operating power for the trimming apparatus is received by a drive shaft 64 and is transferred to each countershaft 54 by means of a sprocket 66 mounted on the drive shaft 64, a sprocket 68 mounted on the countershaft 54, and a timing belt 70 extending around the sprockets 66 and 68. A cross shaft 72 having an operating handle 74 is provided for selective operation to vary the distance between the opposite sides of the trimming apparatus 48 and thereby regulating the width of the bonded belt loop formed by the system 10. The trimming apparatus 48 further includes suitable apparatus 76 for sharpening the cutting wheels 52.

Referring again to FIG. 1, the system for making bonded belt loops 10 further includes a folding apparatus 80 which is situated in the support 14 between the trimming apparatus 48 and the revolving bonding drum apparatus 32. As is best shown in FIG. 3, the folding apparatus 80 includes support structure 82 including an upper surface 84 which extends substantially parallel to the upper surface of the support 14. The surface 84 of the support structure 82 supports the strip of interfacing material 18, the mid-portion of the strip of belt loop material 12, and the endless belt 16.

The folding apparatus 80 further comprises slotted portions 86 extending under the support structure 82. The ends of the slotted portions 86 facing the trimming apparatus 48 are suitably curved so as to gradually fold the opposed edges of the strip of belt loop material 12 under the strip of interfacing material 18. By this means the edges of the strip of belt loop material 12 are positioned for engagement with the adhesive layer 22 of the strip of interfacing material 18.

The endless belt 16 next transports the strip of belt loop material 12 and the strip of interfacing material 18 into engagement with the revolving bonding drum apparatus 32. As is best shown in FIG. 4, the revolving bonding drum apparatus 32 comprises an aluminum ring 90 having a relatively large diameter cylindrical periphery 92. the ring 90 further comprises an annular chamber 94 which receives a circular heating band 96. The heating band 96 is normally retained in the chamber 94 by means of a ring-shaped cover plate 98.

The revolving bonding drum apparatus 32 further includes a hub 100 which is secured to the ring 90. A spacer tube 102 is mounted on the hub 100 and in turn supports a commutator assembly 104. The commutator assembly 104 comprises a plurality of rings 106 formed from an insulating material and a plurality of conductive rings 108. The rings 108 are utilized to supply operating power for the heating band 96 and also serve as electrical connections to a thermocouple 110 which is utilized to regulate the operation of the revolving bonding drum apparatus 32.

In the operation of the revolving bonding drum apparatus 32, each incremental segment of the strip of belt loop material 12 and the aligned incremental segment of the strip of interfacing material 18 are maintained in engagement with a particular segment of the periphery 92 of the ring 90 during a substantial portion of a revolution of the bonding drum apparatus 32, i.e., approximately 270°. During this time interval, the heating band 96 of the bonding drum apparatus 32 applies sufficient heat to the adhesive layer 23 of the strip of interfacing material 18 to effect activation thereof. Simultaneously the endless belt 16 presses the opposed edges of the strip of belt loop material 12 into engagement with the now activated adhesive layer 22 on the strip of interfacing material 18. This causes the strip of belt loop material 12 to be permanently bonded to the strip of interfacing material 18. The completed belt loop string emerges from the system for making bonded belt loops in the manner illustrated in FIG. 1 at 112.

Operating power for the system for making bonded belt loops 10 is supplied by a motor 120. The motor 120 has an output 122 which is connected to the input 124 of a variable speed transmission 126 by means of a belt 128. The output of the motor 120 is also drivingly connected to the drive shaft 64 of the trimming apparatus 48 by means of a belt 130. The transmission 126 has an output 132 which is drivingly connected to the revolving bonding drum apparatus 32 by means of a belt 134. the revolving bonding drum apparatus 32 in turn drives the endless belt 26. Those skilled in the art will appreciate the fact that by means of suitable adjustments to the transmission 126 to regulate the speed of operation of the revolving bonding drum assembly 32 and by means of concurrent adjustments to the operating power which is supplied to the heating band 96, the operating parameters of the system 10 may be varied in order to optimize the bonding of the strip of belt loop material 12 to the strip of interfacing material 18.

A completed bonded belt loop 140 fabricated by means of the present invention is illustrated in FIG. 5. Thus, in accordance with the present invention, the opposed edges of the strip of belt loop material 12 are adhesively secured to one side of the strip of interfacing material 18. However, the remainder of the adjacent surfaces of the strip of belt loop material 12 and the strip of interfacing material 18 are not adhesively secured one to the other. The folding apparatus 80 of the system 10 is so constructed that the opposed edges of the strip of belt loop material 12 are secured to the strip of interfacing material 18 in a spaced apart relationship. By this means there is prevented any overlapping of the edges of the belt loop material in the finished belt loop. Moreover, the trimming apparatus is so adjusted that the edges of the strip of belt loop material 12 extend beyond the edges of the strip of interfacing material 18. In actual practice such a belt loop has been found to be considerably more satisfactory than would be the case if the strip of belt loop material 12 were to be wrapped tightly around the strip of interfacing material 18.

Referring again to FIG. 1, each length of belt loop material 12 is positioned lengthwise on the support 14 and is advanced into engagement with the endless belt 16. It will be understood that the strip of belt loop material 12 may extend to any desired length, and may be fed from a supply reel if circumstances require. However, under more usual circumstances the strips of belt loop material 12 will comprise relatively short lengths of material which would otherwise be considered as scraps generated during the cutting of cloth for the manufacture of men's trousers and similar garments. For example, the strips of belt loop material 12 may have overall length as short as about 10 inches or less.

The strips of belt loop material are fed into the system sequentially and in an end-to-end relationship. It will be understood that the strip of interfacing material 18 is substantially continuous relative to the strips of belt loop material 12, and therefore serves to connect the strips of belt loop material 12 into a relatively long string which emerges from the revolving bonding drum apparatus 32 of the system 10 in the manner illustrated in FIG. 1 at 112. This string is then processed into individual belt loop segments by means of a belt loop trimming apparatus. The individual belt loop segments are thereafter crimped in a belt loop crimping apparatus, after which the belt loop segments are attached to men's trousers or similar garments.

From the foregoing, it will be understood that the present invention comprises a system for making bonded belt loops which incorporates numerous advantages over the prior art. Thus, by means of the invention, belt loops are fabricated on a continuous basis, thereby eliminating the time-consuming and costly manual operations which are required when belt loops are manufactured by the sewing process. Another advantage deriving from the use of the invention involves the fact that the bonded belt loops may be manufactured by means of the invention to any desired width and yet do not exhibit any tendency toward wrinkling or distortion as is often observed in the case of sewn belt loops of greater than conventional width. Still another advantage relates to the fact that substantially greater cloth utilization is realized by means of the invention.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. Apparatus for making bonded belt loops which comprises:

means for directing a strip of interfacing material having a thermally responsive adhesive layer on one side only thereof and a strip of belt loop material along a predetermined path with the reverse side of the belt loop material engaging the side of the interfacing material opposite the adhesive layer;

means positioned on opposite sides of the predetermined path for trimming the strip of belt loop material to a predetermined width;

means positioned on the path beyond the trimming means for folding the strip of belt loop material around the strip of interfacing material such that the belt loop material extends outwardly beyond the edges of the interfacing material and such that edges of the belt loop material are positioned in a spaced apart relationship in engagement with the thermally responsive adhesive layer on the interfacing material; and rotating bonding drum means comprising a portion of the path extending beyond the folding means for applying heat to the adhesive layer in sufficient quantity to effect activation thereof and for simultaneously pressing the strip of belt loop material into engagement with the adhesive layer and thereby permanently bonding the strip of belt loop material to the strip of interfacing material;

the strip directing means includes an endless belt extending along the predetermined path for transporting both the strip of interfacing material and the strip of belt loop material through the trimming means, through the folding means, and around the bonding drum means.

2. The apparatus for making bonded belt loops according to claim 1 wherein the trimming means comprises rotating knives disposed on opposite sides of the path and each comprising a non-circular periphery.

3. The apparatus for making bonded belt loops according to claim 2 wherein the folding means comprises a member disposed along the predetermined path for supporting the strip of interfacing material, the center portion of the strip of belt loop material, and the endless belt and slot means disposed under the predetermined path for receiving the opposite edges of the strip of belt loop material and thereby folding the strip of belt loop material around the strip of interfacing material.

4. The apparatus for making bonded belt loops according to claim 3 wherein the bonding drum means includes a revolving drum having heating means disposed therein, and wherein the endless belt functions to press the strip of belt loop material and the strip of interfacing material against the drum with the folded edges of the strip of belt loop material in engagement with the adhesive layer.

5. Apparatus for making bonded belt loops which comprises:

structure defining a predetermined path;

endless belt means for transporting a strip of interfacing material having a thermally responsive adhesive layer formed on one side only thereof and a strip of belt loop material along the predetermined path with the belt loop material engaging the side of the interfacing material opposite the adhesive layer;

a pair of rotating knives disposed on opposite sides of the predetermined path for trimming the belt loop material to a predetermined width;

folding means disposed along the predetermined path beyond the rotating knives and comprising structure for supporting the strip of interfacing material, the center portion of the strip of belt loop material, and the endless belt means and slot means disposed under the support means for receiving the opposite edges of the strip of belt loop material and thereby folding the strip of belt loop material around the strip of interfacing material;

said knives and folding means for trimming and folding the belt loop material such that the edges of the belt loop material extend beyond the edges of the interfacing material in the finished belt loop and such that the opposed edges of the belt loop material are positioned in a spaced apart relationship so as to prevent overlapping of the edges in the finished belt loop; and bonding means disposed along the predetermined path beyond the folding means for cooperation with the endless belt means to simultaneously heat the adhesive layer sufficiently to effect activation thereof and press the opposite edges of the strip of belt loop material into engagement with the activated adhesive layer and thereby permanently bonding the strip of belt loop material to the strip of interfacing material.

6. The apparatus fo making bonded belt loops according to claim 5 wherein the bonding means comprises a revolving drum having heating means disposed therein for receiving the strip of interfacing material having the strip of belt loop material folded therearound from the folding means with the opposed edges of the strip of belt loop material engaging the drum.

7. The apparatus for making bonded belt loops according to claim 5 wherein the rotating knives each comprise the non-circular periphery.

8. The apparatus for making bonded belt loops according to claim 5 further including vacuum means for receiving the trimmed edges of the strip of belt loop material from the rotating knives.

9. Apparatus for making bonded belt loops which comprises:

a revolving drum having heating means disposed therein;

support means extending to a point adjacent the rotating drum;

endless belt means mounted for rotation around the course including a portion extending along the support means and a portion extending around a substantial portion of the periphery of the revolving drum;

said endless belt means for transporting a strip of interfacing material having a thermally responsive adhesive layer formed on one side only thereof and a strip of belt loop material along a predetermined path extending along the support means and around a substantial portion of the periphery of the drum with the reverse side of the strip of belt loop material engaging the side of the strip of interfacing material opposite the adhesive layer and with the opposed edges of the strip of belt loop material engaging the drum;

means disposed on opposite sides of the predetermined path and at the end of the support means remote from the rotating drum for trimming the strip of belt loop material to a predetermined width; and folding means disposed along the predetermined path between the trimming means and the revolving drum and comprising structure defining an extension of the support means for supporting the strip of interfacing material, the center portion of the strip of belt loop material, and the endless belt means and slot means disposed under the support structure for receiving the opposite edges of the strip of belt loop material and thereby folding the strip of belt loop material around the strip of interfacing material;

said revolving drum means for heating the adhesive layer on the strip of interfacing material sufficiently to effect activation thereof and for simultaneously pressing the opposed edges of the strip of belt loop material into engagement with the activated adhesive layer and thereby permanently bonding the strip of belt loop material to the strip of interfacing material.

10. The apparatus for making bonded belt loops according to claim 9 wherein the trimming means comprises opposed rotating knives each having a non-circular periphery.

11. The apparatus for making bonded belt loops according to claim 9 wherein the rotating knives trim the strip of belt loop material to a width such that the edges of the belt loop material extend beyond the edges of the interfacing material in the finished belt loop.

12. The apparatus for making bonded belt loops according to claim 9 wherein the folding means positions the opposed edges of the strip of belt loop material in a spaced apart relationship so as to prevent overlapping of the edges in the finished belt loop.

* * * * *